United States Patent
Rutz et al.

[15] 3,673,445
[45] June 27, 1972

[54] DUST SEAL FOR ELECTRIC MOTORS

[72] Inventors: Hansrudolf Rutz, Wettingen; Tassilo Schmollinger, Gebenstorf, both of Switzerland

[73] Assignee: Aktiengesellschaft Brown, Boveri & Cie, Baden, Switzerland

[22] Filed: Dec. 21, 1970

[21] Appl. No.: 99,836

[30] Foreign Application Priority Data

Jan. 7, 1970  Switzerland..............................95/70

[52] U.S. Cl.................................................310/88, 310/90
[51] Int. Cl. .........................................................H02k 5/12
[58] Field of Search..........................310/88, 89, 90; 277/95

[56] References Cited

UNITED STATES PATENTS 1,750,818   3/1930   Sauveur...............................310/88 X
2,522,231   9/1950   Loftis....................................277/95 X

*Primary Examiner*—D. X. Sliney
*Attorney*—Pierce, Scheffler & Parker

[57] ABSTRACT

A dust seal structure applied to electric motors to prevent ingress of dust and other foreign matter into the air gap between the stator and rotor includes a stator supported ring-shaped lip seal member and a ring-shaped spacer member which bear in an axial direction against a corresponding surface on the rotor. The lip seal and spacer members are mounted on an axially movable support ring which is carried by the radially inner ends of a circumferential array of flexible strips whose outer ends are secured to the stator, and compression springs associated with the flexible strips exert an axially directed force which is transmitted to the lip seal and spacer members thus to enable the latter to follow any axial movements of the rotor. The spacer member which is non-yieldable absorbs axial thrust exerted by the springs and thus prevents the lip seal from being deformed as well as acting as a guide for the seal.

4 Claims, 3 Drawing Figures

Inventors
Hansrudolf Rutz
Tassilo Schmollinger

By Pierce, Scheffler & Parker
Attorneys

DUST SEAL FOR ELECTRIC MOTORS

This invention relates to a dust seal for electric motors in which extremely large relative movements occur on the seals between stator and rotor. It is already known to provide radial seals between the stator and rotor of large electrical machines to prevent the ingress of dust, dirt and foreign matter into the air gap between the stator and rotor. The known constructions of seals generally have a lip seal which covers the gap between the stator and rotor. It has also been proposed to construct such lip seals in adjustable form to enable a certain degree of unavoidable wear to be compensated.

The known systems, however, suffer from various disadvantages, for example when fitted into a cement grinding motor, exposed to large concentrations of dust. To minimize deflection of the radial ring seals due to the large thermal expansions and deformations which occur during operation, the clearance, normally amounting to 0.5 to 1 mm, would have to amount to several millimeters. Tolerance of such magnitude would result in the discharge of a substantial amount of cooling air which is required for the motor. Since the air pressure which prevails in the interior of the machine is relatively high, this would necessitate the provision of a large air leakage fan.

When the machine is shut down, this system of seals could allow uncontrollably large quantities of cement dust to penetrate into the motor. It is the object of this invention to avoid the disadvantages of the prior art. Since the sealing parts must be in physical contact with each other in order to provide reliable sealing, it is necessary for the individual sealing parts to be disposed movably in order to permit adaptation to the large relative movements. This is best accomplished by using axially slidable ring seals.

The aforementioned problem is solved according to the present invention in that the seals are constructed in a plurality of parts in order to compensate for axial and radial movements of the rotor. One of the parts is a yieldable ring-shaped lip seal which bears axially against a correspondingly positioned surface on the rotor while the other part, also ring-shaped, but non-yieldable and bearing against the surface of the rotor serves to absorb axial thrusts of the rotor and guide the lip seal as well as prevent deformation of the lip seal.

More particularly, the seal structure which prevents ingress of dust and other foreign matter into the air gap between the stator and rotor components of the motor includes a stator supported ring-shaped lip seal member and a ring-shaped spacer member which bear in an axial direction against a corresponding surface portion of the rotor. The lip seal and spacer members are mounted on an axially movable support ring which is carried by the radially inner ends of a circumferential array of flexible strips whose outer ends are secured to the stator, and compression springs individual to each of the flexible strips exert an axially directed force which is transmitted to the lip seal and spacer members thus to enable the latter to follow any axial movements of the rotor. The spacer member being non-yieldable absorbs axial thrust exerted by the springs and thus prevents the lip seal from being deformed as well as acting as a guide for the seal.

The improved multi-part ring seal structure according to the invention assures a 100 percent sealing effect over a very large diameter.

In addition to the multi-part dust seal provided for sealing during operation of the motor, the invention also provides a ring-shaped bellows associated with the ring-seal which provides a further sealing effect to prevent ingress of dust into the gap between the stator and rotor, particularly when the motor is shut down, i.e., is at standstill.

One suitable embodiment of the invention will now be described in detail and is illustrated in somewhat simplified form in the accompanying drawings wherein.

Figure 1:
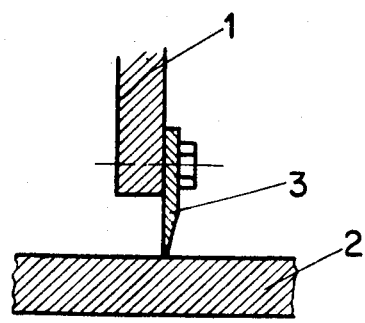
FIG. 1 illustrates a dust seal of the type already known in the art.

With reference now to the drawings, and to FIG. 1 in particular, for purposes of background information, there is illustrated a radial sealing system of the type as known to the prior art. Numeral 1 designates the stator of the motor on which is mounted a radial seal 3 to cover the gap between the stator and the rotor 2 to prevent ingress of dust and other foreign matter. When such a radial seal is used, for example, in a cement mill in which the grinding drum assumes a greater or lesser angle in operation due to temperature changes and therefore results in a relatively large radial and axial movement of the sealing surface on the rotor, it follows that complete sealing to prevent ingress of dust cannot be ensured.

Figure 3:
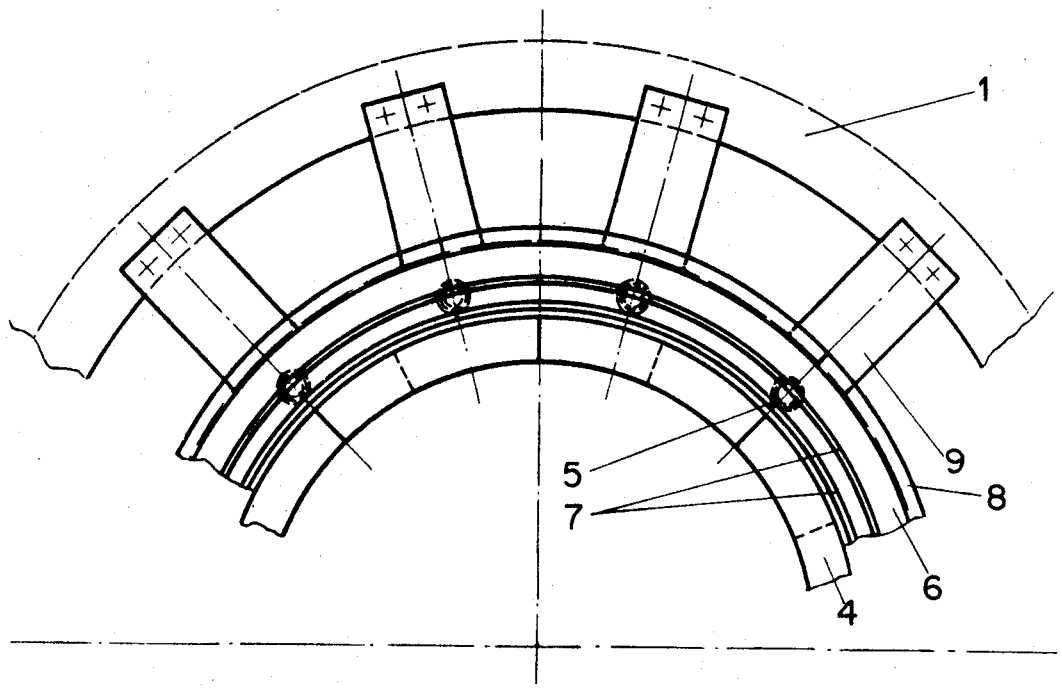
FIG. 3 is a sectional view taken along line A—A of FIG. 2.
Figure 2:
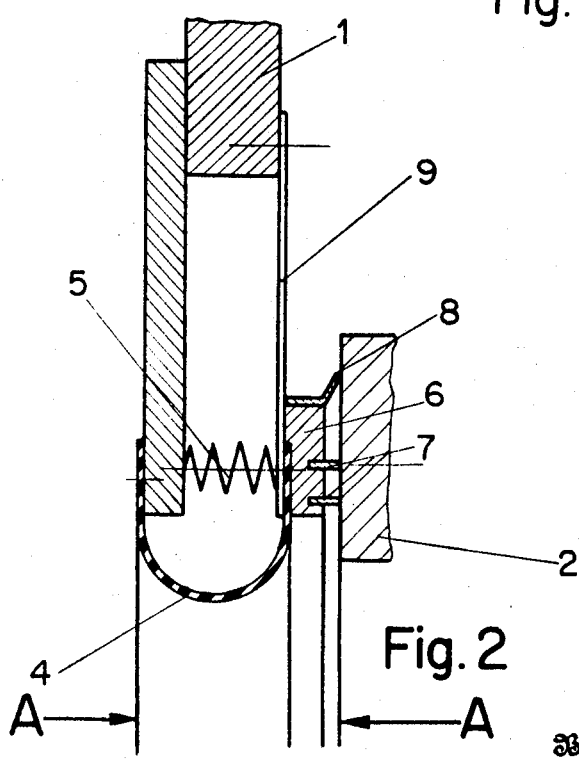
FIG. 2 is a vertical section through the improved seal structure in accordance with the present invention.

In accordance with the invention, as depicted in FIGS. 2 and 3, the multi-part ring seal includes a yieldable ring-shaped lip seal 8 and at least one non-yieldable ring-shaped spacer strip 7 (two concentric rings 7 are shown) which bear in an axial direction against a corresponding surface portion of the rotor 2. The lip seal 8 and the two spacer members 7 disposed in concentric radial relation to the axis of the rotor are secured to an axially movable resiliently mounted support ring 6 which is carried by the inner ends of a circumferential array of flexible strips 9 whose outer ends are secured to the stator. Compression springs 5 individual to the flexible strips 9 exert an axially directed force against the strips which, in turn, is transmitted through the support ring 6 to the lip seal 8 and spacer members 7 thus to enable the latter to follow any axial movement of the rotor without disturbing the seal. The concentric, radially spaced, non-yieldable spacer members 7 absorb axial thrust exerted by the springs 5 as they press against the shaft surface and thus prevent the lip seal 8 from being deformed, as well as acting as a guide for the lip seal.

A ring-shaped bellows 4 located radially inward of the flexible strips 9 and their springs 5 functions to prevent ingress of dust and other foreign matter into the gap between stator and rotor, particularly when the motor is shut down, i.e., is at standstill.

Thus, the ring-shaped seal assembly comprising the ring lip seal 8 and spacer ring members 7 which bears in a resilient manner against the surface of the rotor effects the desired seal and which is satisfactorily maintained even though there be some radial and/or axial displacement of the rotor relative to the stator.

The inventive concept is not limited to the actual embodiment which has been illustrated. It is possible, for example, to locate the lip seal 8 radially inward of the ring spacers 7, or between the two ring spacers.

We claim:

1. In a dust seal structure applied in electric motors to prevent ingress of dust and other foreign matter into the air gap between the stator and rotor, the combination comprising a yieldable ring-shaped lip seal member and a non-yieldable ring-shaped spacer member which bear in an axial direction against a corresponding surface on the rotor, a support ring on which said lip seal and spacer members are mounted, means for resiliently securing said support ring to said stator, and means including spring means for applying an axially directed force against said support ring and which is correspondingly transmitted to said lip seal and spacer members thereby to enable the latter to follow any axial movement of the rotor, said spacer member serving to absorb the axial thrust applied to said support ring and thereby prevent deformation of said lip seal member.

2. A dust seal structure for electric motors as defined in claim 1 wherein said means for resiliently securing said support ring to said stator is constituted by a circular array of circumferentially spaced flexible strips and wherein said spring means for applying an axially directed force against said support ring is constituted by compression springs which respectively bear against said flexible strips.

3. A dust seal structure for electric motors as defined in claim 1 and which further includes a ring-shaped bellows secured to the stator and which prevents ingress of dust and other foreign matter into the gap between the stator and rotor and particularly when said motor is at standstill.

4. In a dust seal structure applied to electric motors to prevent ingress of dust and other foreign matter into the air gap between the stator and rotor the combination comprising a ring-shaped yieldable lip seal member and a ring-shaped non-yieldable spacer member which bear in an axial direction against a corresponding surface on the rotor, said lip seal and spacer members being mounted on an axially movable support ring carried by the radially inner ends of a circumferential array of flexible strips whose outer ends are secured to the stator, and compression springs associated with said flexible strips and which exert an axially directed force transmitted through said support ring to said ring-shaped lip seal and spacer members thus to enable the latter to follow any axial movement of the rotor, said spacer member serving to absorb the axial thrust exerted by said springs thereby to prevent deformation of said lip seal member.

* * * * *